United States Patent [19]

Getz et al.

[11] Patent Number: 4,654,924
[45] Date of Patent: Apr. 7, 1987

[54] MICROCOMPUTER CONTROL SYSTEM FOR A CANISTER VACUUM CLEANER

[75] Inventors: Edward H. Getz, Pipestone Township, Berrien County; Roger D. Burdi, Royalton Township, Berrien County, both of Mich.

[73] Assignee: Whirlpool Corporation, Benton Harbor, Mich.

[21] Appl. No.: 815,384

[22] Filed: Dec. 31, 1985

[51] Int. Cl.⁴ .................................................. A47L 9/28
[52] U.S. Cl. ........................................ 15/319; 15/339; 15/377; 15/410
[58] Field of Search ................... 15/319, 339, 410, 377

[56] References Cited

U.S. PATENT DOCUMENTS

| | | | |
|---|---|---|---|
| 3,579,706 | 5/1971 | Hetland | 15/377 X |
| 3,588,943 | 6/1971 | Hetland | 15/377 X |
| 4,199,838 | 4/1980 | Simonsson | 15/339 |
| 4,245,370 | 1/1981 | Baker | 15/319 |
| 4,328,522 | 5/1982 | Tryan | 15/319 X |
| 4,342,132 | 8/1982 | From Knecht | 15/339 |
| 4,357,729 | 11/1982 | Vander Molen et al. | 15/319 |
| 4,370,690 | 1/1983 | Baker | 15/319 X |
| 4,370,776 | 2/1983 | Kullik | 15/319 X |
| 4,399,585 | 8/1983 | Kullik et al. | 15/319 |
| 4,418,342 | 11/1983 | Aschoff et al. | 15/339 X |

OTHER PUBLICATIONS

Sears Owner Manual; Kenmore Cannister Vacuum Cleaner, Model 1165.24991 published prior to Dec. 31, 1984.
Whirlpool drawing entitled Schematic dated 10-22-84 for Model No. 2499184.

*Primary Examiner*—Chris K. Moore
*Attorney, Agent, or Firm*—Hill, Van Santen, Steadman & Simpson

[57] ABSTRACT

A control system for a vacuum cleaner comprising three separate sub-control systems located in a canister portion, a power nozzle floor cleaner portion and a suction hose handle portion respectively. The handle portion sub-control includes user input switches and indicator lights and it controls the other two sub-controls. The canister sub-control controls the energization and speed of a suction fan motor as well as sensing pressure levels in the canister and suction hose. The floor cleaner sub-control controls the energization of a beater brush motor as well as sensing the rotational speed of the beater brush and depth of carpeting pile. Microcomputers are used in each circuit and communication between the circuits is done in packet form on a third connector and one side of an AC power line. Diagnostic testing is also built into the control system.

22 Claims, 17 Drawing Figures

FIG. 10 — FROM HANDLE TO POWERMATE

| BIT 1 | BIT 2 | BIT 3 | BIT 4 | BIT 5 | BIT 6 | BIT 7 | BIT 8 |
|---|---|---|---|---|---|---|---|
| PREAMBLE ||||  ON/OFF | TEST MODE (DIAGNOSTICS) |||

FIG. 11 — FROM POWERMATE TO HANDLE

| BIT 1 | BIT 2 | BIT 3 | BIT 4 | BIT 5 | BIT 6 | BIT 7 | BIT 8 |
|---|---|---|---|---|---|---|---|
| PREAMBLE |||| MOTION SENSOR FLAG | PILE HEIGHT |||

FIG. 12 — FROM HANDLE TO CANISTER

| BIT 1 | BIT 2 | BIT 3 | BIT 4 | BIT 5 | BIT 6 | BIT 7 | BIT 8 |
|---|---|---|---|---|---|---|---|
| PREAMBLE |||| ON/OFF | MOTOR SPEED |||

FIG. 13 — FROM CANISTER TO HANDLE

| BIT 1 | BIT 2 | BIT 3 | BIT 4 | BIT 5 | BIT 6 | BIT 7 | BIT 8 |
|---|---|---|---|---|---|---|---|
| PREAMBLE |||| NOT USED | BAG/HOSE DATA |||

MICROCOMPUTER CONTROL SYSTEM FOR A CANISTER VACUUM CLEANER

BACKGROUND OF THE INVENTION

1. Field of the Invention

The present invention relates to vacuum cleaners and more particularly to a microcomputer control system for a vacuum cleaner.

2. Description of the Prior Art

U.S. Pat. No. 3,588,943 discloses a control circuit for a vacuum cleaner, the vacuum cleaner having a motor fan suction unit and a floor contacting motor brush unit. The control circuit includes a switch on the vacuum cleaner handle to control current flow to both of the motors.

U.S. Pat. No. 3,579,706 discloses a vacuum cleaner motor control comprising a first switch circuit including an electric current varying means for varying the current to a suction motor and a second switch circuit for energizing the motor of the motor brush unit for cleaning the floor.

U.S. Pat. No. 4,245,370 discloses a control circuit for protecting a vacuum cleaner motor from jammed beater brush damage. A Hall effect sensor is used to detect the rotational speed of the beater brush. The control circuit effects discontinuation of the energization of the motor in the event that the rotational speed of the beater brush drops below a preselected speed.

U.S. Pat. No. 4,357,729 discloses a vacuum cleaner control which reduces the total current delivery to the vacuum cleaner when both a suction motor and a brush motor are being operated concurrently where the full load currents of the suction and brush motors cumulatively total an amount greater than a preselected safe current deliverable to the vacuum cleaner.

SUMMARY OF THE INVENTION

The present invention provides a control system to control a canister vacuum cleaner incorporating three circuits, one each located in the canister, the power nozzle and the handle assemblies. Each circuit contains a four-bit microcomputer for control of the various functions associated with each sub-system, as well as for communication. The handle control is the master control, while the power nozzle control and canister control are slaved to the handle control although it is also forseen to use the canister control as the master. Communication is provided between the handle and the power nozzle floor cleaner and between the handle and canister via a third conductor and one of the leads of the AC power line. Serial data is transmitted in the control circuits by generating a 60 cycle square wave in synchronization with the 60 cycle power line and sending one bit of information every full line cycle. Information is transmitted in packet form.

The system incorporates diagnostics such that feature functionality tests can be conducted easily in the manufacturing process and by service personnel in the field.

The present device provides the following functions directed to the consumer:

1. Pile height sensor in the power nozzle floor cleaner and display of the pile height on the handle via 4 LEDs in a bar graph type display.
2. Belt protection circuitry in the power nozzle floor cleaner and display of system shut-down due to belt breakage on the handle via a flashing LED.
3. Canister vacuum motor speed control (suction level) controlled from the handle in four discreet steps and five speeds.
4. Vacuum motor speed displayed on the handle via five LEDs.
5. Hose blockage sensor in the canister and displayed on the handle via a flashing LED.
6. Full bag sensor in the canister and displayed on the handle via a flashing LED.

The device provides the following functions directed to manufacturing and service personnel:

1. Fast functionality testing of the assembled product by pressing the proper sequence of buttons on the handle keyboard.
2. Fast and easy modification of belt protector cut-out speed if variations in manufacturing processes for the motor and/or the power nozzle floor cleaner result in a change in motor speed-torque characteristics.

DESCRIPTION OF THE PREFERRED EMBODIMENTS

Figures 1, 2:
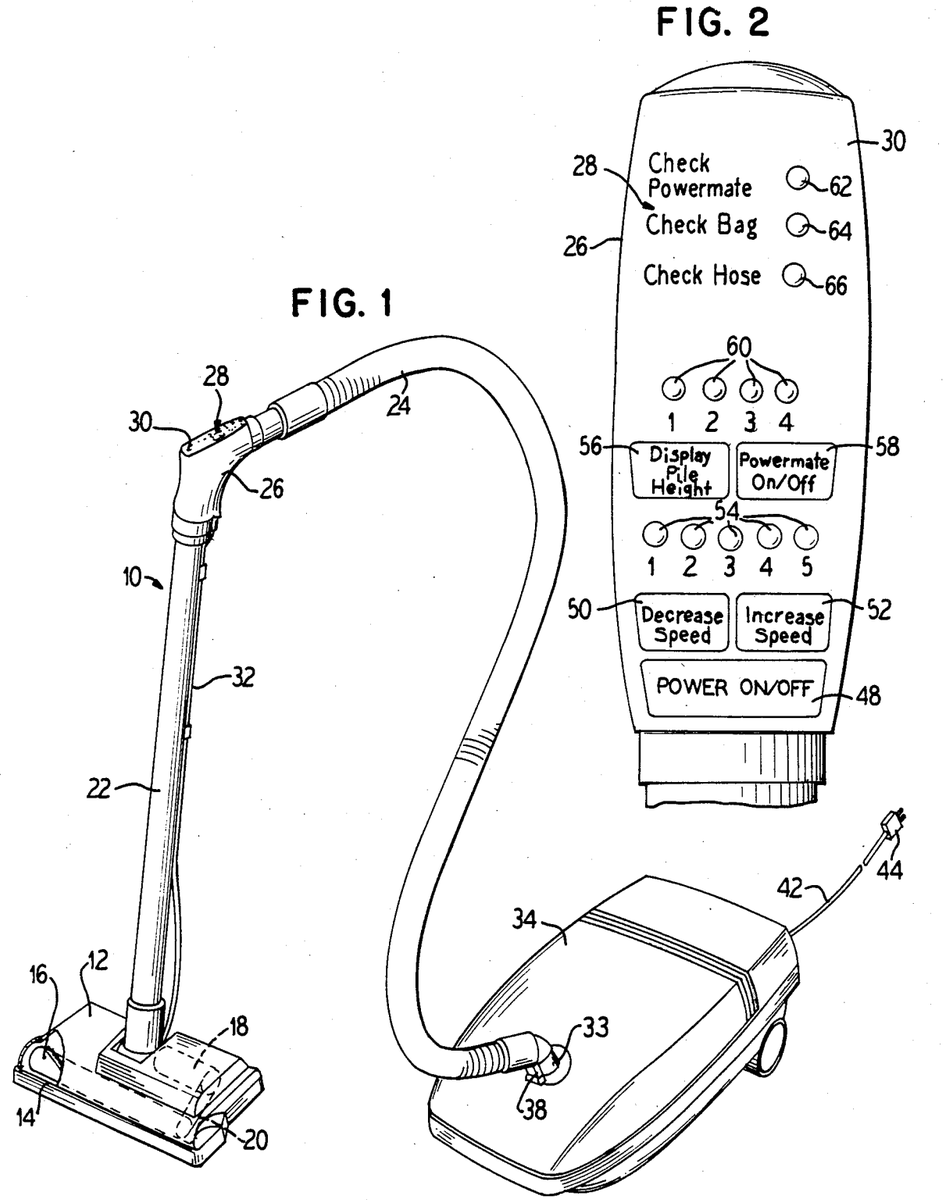
FIG. 1 is a perspective view of a vacuum cleaner having a canister, handle and a power nozzle floor cleaner embodying the principles of the present invention.
FIG. 2 is a plan view of the handle control panel and display portion of the vacuum cleaner shown in FIG. 1.

In FIG. 1 there is shown generally a vacuum cleaner at 10 which includes a power nozzle floor cleaning device 12 sometimes referred to under the trademark "Powermate", having a nozzle 14 provided with a rotating brush 16 driven by a brush motor 18 through a drive belt 20. The power nozzle floor cleaner 12 is provided with a hollow wand section 22 connected to a suction hose 24 at a handle portion 26. The hose 24 is conventional and includes three spirally-wound electrical conductors embedded in the hose which support the hose and conduct current between the hose terminals at the ends of the hose 24. A plurality of electrical controls and displays 28 are provided on a control panel and display comprising a top face 30 of the handle portion 26. A three wire cord 32 connects the electrical circuitry in the handle portion 26 with the circuitry in the power nozzle floor cleaner 12.

Figure 14:
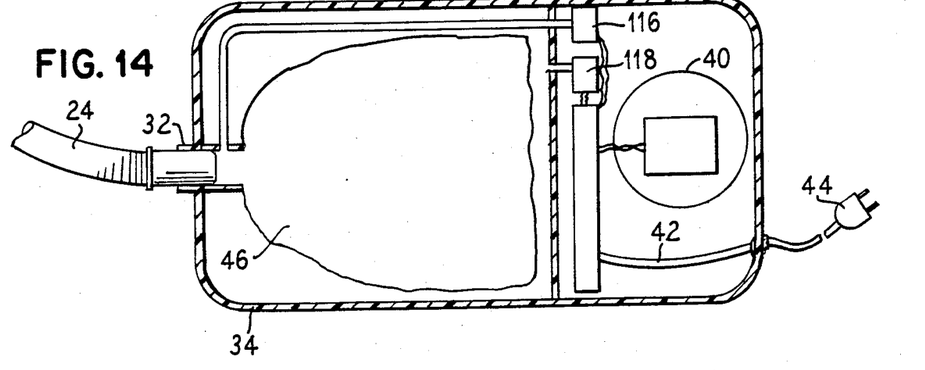
FIG. 14 is a sectional view of the canister of FIG. 1 showing the interior thereof.

Suction is provided to the nozzle 14 through the suction hose 24 which is attached to a suction inlet 33 of a canister suction unit 34. The suction hose 24 connects at one end to the circuitry in the handle 26, and via a plug 38 connects to the circuitry within the canister 34. As seen in FIG. 14, the canister suction unit 34 includes a suction fan motor 40 mounted within the canister 34, a power cord 42 and a conventional electrical plug 44. When the suction motor 40 is energized to operate the suction fan, a vacuum is applied to the nozzle 14 through the wand 22 and the suction hose 24 to effect the desired vacuum cleaning operation. As is conventional in such systems, a suitable dirt-collecting filter bag 46 is provided within the canister 34 for collecting the dirt sucked from the surface being cleaned such as the floor being cleaned by the nozzle 14.

FIG. 2 is a plan view of the handle portion 26 showing the various controls and indicators 28. At the bottom of the handle control panel there is provided a switch 48 labeled "Power On/Off" which a user would operate to energize both the suction motor 40 as well as the power cleaner motor 18. Just above the main power switch 48 are provided two laterally spaced touch-actuated switches 50, 52 which, respectively, permit the user to decrease or increase the speed of the suction motor 40. As will be described in greater detail below, the speed of the suction motor 40 can be stepped through a series of five discreet speeds. Just above the speed switches 50, 52 are provided five LEDs 54 which provide a visual indication to the user as to the speed level selected. Once a speed level has been selected, it is "remembered" by the vacuum cleaner control, even if the power is turned off and later turned on. That is, when the power is later turned on, the control will operate the suction motor 40 at the speed last selected.

Just above the speed indicating LEDs, there are provided two laterally spaced touch-actuated switches 56, 58. The first switch 56 can be operated to cause a sensed pile height to be displayed on a plurality of LEDs 60 positioned just above the pile height switch 56. The second switch 58 allows the user to selectively deenergize and reenergize the motor 18 in the power nozzle device 12 independently of the main on/off switch 48.

At the top of the handle there are three separate indicator LEDs, a top indicator 62 indicates a detected fault in the power floor cleaner 12, a second indicator 64 indicates a full dirt filter bag 46 and a third indicator 66 indicates a blocked suction hose 24.

To more fully explain the controls and indicators shown in FIG. 2, FIGS. 3, 4 and 5 show the electrical schematics for the control circuitry in the canister 34, the handle 26 and the power nozzle 12, respectively.

Figure 4:
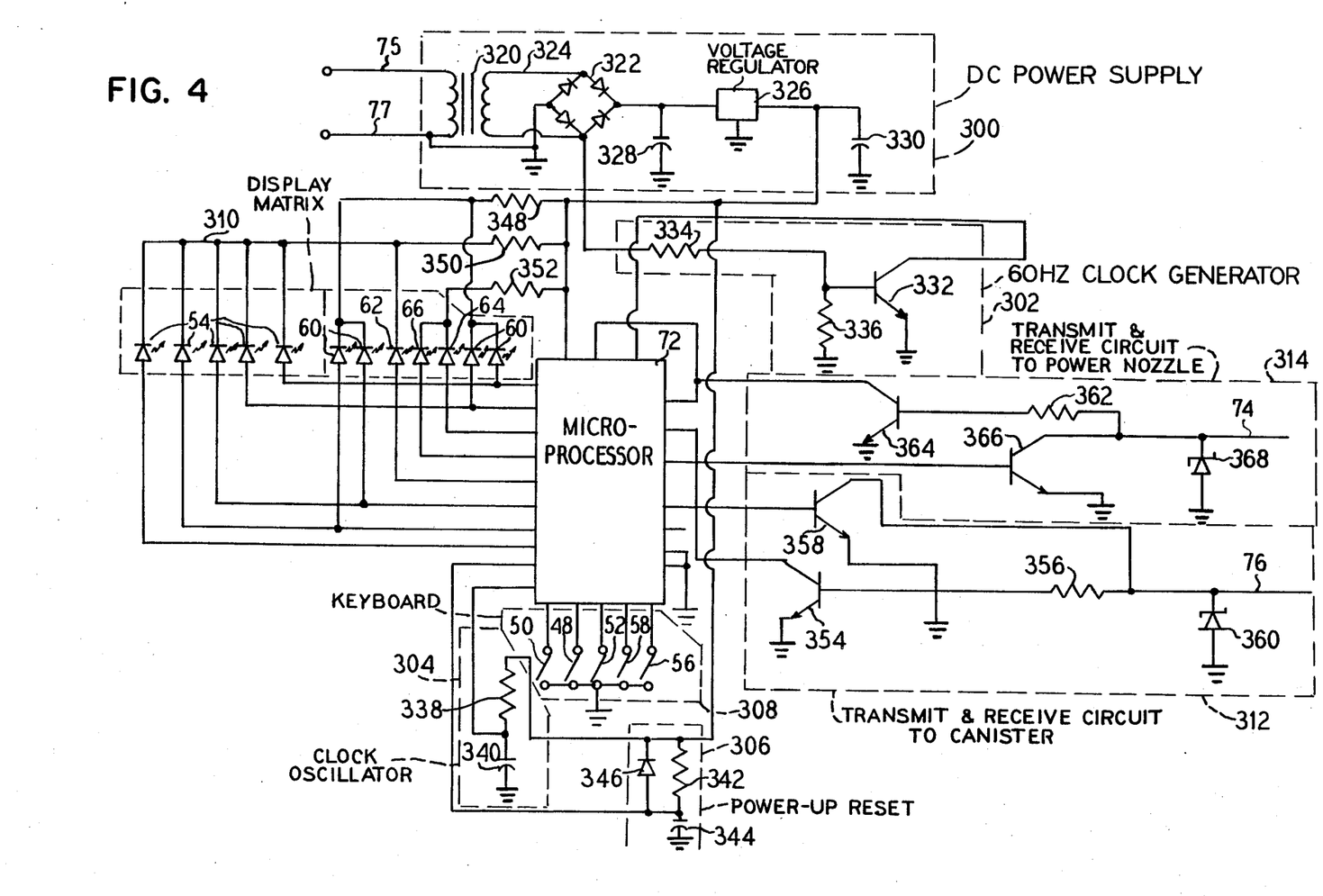
FIG. 4 is an electrical schematic for the control circuit in the handle.

Firstly, the handle control circuitry is shown in FIG. 4. This portion of the control contains a four-bit microcomputer 72 such as a National Semiconductor, Inc. COPS 420, and associated electronics to control the system as well to provide an interface to the user. Input from the user is accomplished via five touch-actuated switches identified above with the following functions:

| Switch Label | Switch Function |
| --- | --- |
| Power On/Off 48 | Turns entire system on or off. |
| Increase Speed 52 | Increases canister motor speed until reaching maximum speed. |
| Decrease Speed 50 | Decreases canister motor speed until reaching minimum speed. |
| Powermate On/Off 58 | Turns power cleaner motor on or off regardless of main on/off function. |
| Display Pile Height 56 | Initiates a pile height reading to be made in the power cleaner device and displays the reading on the handle on LEDs 60. |

Display to the user is accomplished via 12 LEDs with the following functions:

| LED Label | LED Function |
| --- | --- |
| Motor Speed 54 (5 LEDs) | Displays the selected suction motor speed in a bar-graph format (1 LED on at a time). |
| Pile Height 60 (4 LEDs) | Displays the pile height sensed in a bar-graph format (1 LED on at a time). |
| Check Powermate 62 | Indicates a system shut down due to broken belt or obstructed beater bar via a flashing light format. |
| Check hose 66 | Indicates that pressure sensor (s) in canister detected a plugged hose, via a flashing light display format. |
| Check bag 64 | Indicates that a pressure sensor in the canister detected a full bag via a flashing light display format. |

The handle control circuitry of FIG. 4 includes a D.C. power supply portion 300, a 60 Hz. clock signal generator 302, a clock oscillator 304, a power-up reset portion 306, a keyboard 308 for user inputs, a display LED matrix 310, a transmit and receive portion 312 for the canister 34, and a transmit and receive portion 314 for the power nozzle 12. The D.C. power supply portion 300 is connected to A.C. power leads 75 and 77 which are connected to standard A.C. power, such as at a wall outlet. A transformer 320 provides a voltage reduction of from 120 volts to approximately 20–30 volts, depending upon the load requirements. A full-wave rectifying bridge 322 is connected across a secondary 324 of the transformer 320. At the output of the rectifying bridge 322 is a voltage regulator 326 and a pair of filtering capacitors 328 and 330, which provides a 5 volt regulated voltage for the microprocessor 72.

The 60 Hz. clock signal generator 302 is also connected to the transformer secondary 324 and includes a transistor 332 and biasing resistors 334 and 336. The 60 Hz. generator 302 generates a square wave timing signal in synchronization with 60 Hz. power line signal for use by the microprocessor 72. The 60 Hz. timing, or clock, signal is used to synchronize data communications between the handle 26 control of FIG. 4 and the canister 34 and power nozzle 12 controls. It is also foreseen to use a 50 Hz. timing signal where applicable.

The clock oscillator 304 is an RC oscillator formed of a resistor 338 and a capacitor 340 for providing a timing signal for internal use by the microprocessor 72. The power-up reset portion 306 has a resistor 342 connected to a capacitor 344 with an RC time constant long enough to hold the microprocessor 72 at a reset level until the D.C. power supply has reached a steady state voltage and for the clock oscillator 304 to achieve its operating frequency. A diode 346 is connected to release, or dump, the charge stored in the capacitor 344 when power is removed from the system so that the microprocessor 72 may be reset quickly.

The keyboard 308 is connected directly to the microcomputer 72 to provide means for inputting user information. In a preferred embodiment, the keyboard 308 includes a plurality of touch sensitive dome switches. As described above, the LEDs 54 and 60–66 display the outputs of various sensing and protection circuitry. The LEDs are multiplexed so that power supply requirements and heat build up are lower; multiplexing is accomplished in synchronization with the 60 HZ. signal at a 50% duty cycle with a 1/60 second period. A maximum of two LEDs are on during any half line cycle. Resistors 348, 350 and 352 are connected to set the LED current.

The transmit and receive portion 312 provide serial data communication to and from the canister 34 control. As will be described more fully hereinafter, the maximum voltage on line 76 is held at 19 volts. A transistor 354 and resistor 356 level shift and amplify signals on lead 76 from the canister 34 control for use by the microcomputer 72. A transistor 358 is connected to selectively pull the voltage on line 76 to zero (logic 0) for data transmission to the canister 34 control.

Transmission of data to the canister control is as follows: a logic zero is transmitted when the microcomputer 72 supplies a logic one to the base of the transistor 358 at a negative transition of the 60 Hz. clock signal, which results in the line 76 being held at approximately zero volts. For the transmission of a logic one data bit, the base of the transistor 358 is placed at a logic zero so that a positive going signal is allowed to occur on the line 76 at the negative clock transition.

Data is received from the canister 34 as follows: when a negative going transition of the 60 Hz. clock pulse occurs, the microcomputer 72 monitors the collector of the transistor 354. If a logic one is on line 76, the collector will be at logic zero and, if a logic zero is received on line 76 from the canister 34, the collector will be at logic one. Thus, transmission and reception of data is in synchronization with the 60 Hz. power line frequency.

The data voltage level on line 76 is high enough to insure that low cost dry connectors can be used and still have reliable data transmission. A zener diode 360 is connected at the line 76 to protect the device from voltage spikes that may occur when the hose 24 is connected or disconnected from the canister unit 34 at the plug 38.

The transmit and receive portion 314 for serial data transfer to and from the power nozzle 12 includes a resistor 362 and a transistor 364 for amplifying received data and a transistor 366 for transmitting data over lead 74, similar to the circuit portion 312 described above. A zener diode 368 is provided for over voltage protection.

Although a 60 band data transfer rate has been described, it is also foreseen to transmit two or more data bits during each positive half cycle of the clock signal.

When the plug 44 is plugged in, the system is powered up with the power nozzle floor cleaner motor 18 and the canister suction motor 40 off and no LEDs on.

Figure 9:
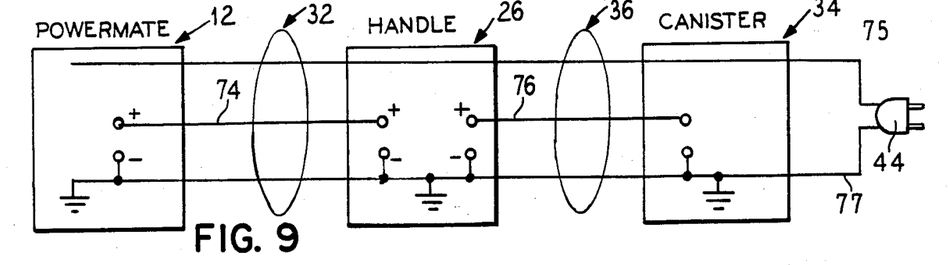
FIG. 9 is a schematic drawing of the wiring connections of the three circuits.
Figure 10:
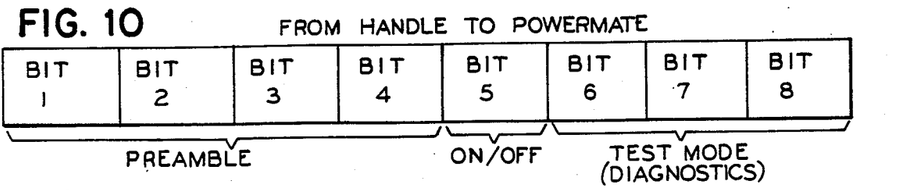
FIG. 10 is a diagramatic view of information transmitted from the handle to the power nozzle floor cleaner.
Figure 12:
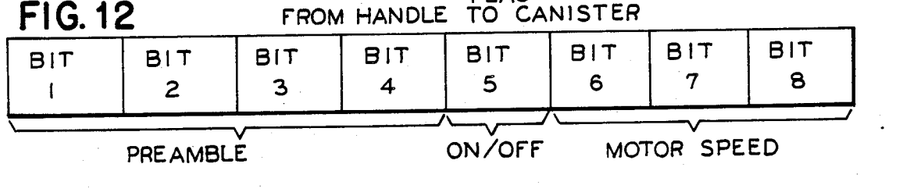
FIG. 12 is a diagramatic view of information transmitted from the handle to the canister.

With power up, the handle control 26 begins to transmit data packets shown in FIGS. 10 and 12 to the power nozzle 12 and canister control 34. This is done via the circuitry schematically shown in FIG. 9 in which there are the two electrical lines 75 and 77 representing the AC power line, the third communications line 76 connecting the handle circuitry 26 with the canister circuitry 34 through the hose 24 and the third communications line 74 connecting the handle 26 with the power nozzle circuitry 12 though the cord 32 as shown; one side of the AC lines is used as a ground for the communications circuit. The data packets shown in FIGS. 10 and 12 show the information sent from the handle 26 to the power nozzle 12 and canister 34, respectively.

The data packet to the power nozzle 12, FIG. 10, contains a four-bit preamble, a bit 5 relating to the on or off condition of switches 48 and 58, and bits 6, 7 and 8 relating to a test mode. The data packet to the canister, FIG. 12, includes a four-bit preamble, bit 5 contains information relating to the on or off position of switch 48 and bits 6, 7 and 8 contain information relating to the selected motor speed for the canister motor 40. In both cases, the on/off bit (bit 5) is initially set to the off level, thus, indicating to the slave, or outboad, contol to remain off.

Figure 11:
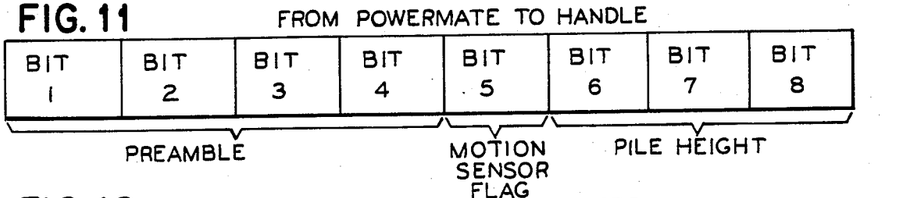
FIG. 11 is a diagramatic view of information transmitted from the power nozzle floor cleaner to the handle.
Figure 13:
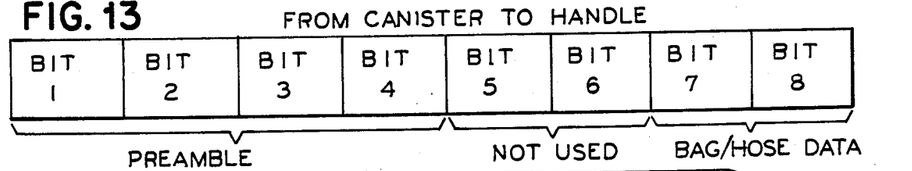
FIG. 13 is a diagramatic view of information transmitted from the canister to the handle.

After receiving the above-described data packets, the respective slave units will then transmit back to the handle data packets as shown in FIGS. 11 and 13 via the circuitry shown schematically in FIG. 9. FIG. 11 shows the data packet from the power nozzle 12 to the handle 26 which includes a four-bit preamble, a motion sensor flag in a bit 5, and pile height information in bits 6, 7 and 8. The canister 34 transmits a data packet containing a four-bit preamble, filter bag and hose condition data in bits 7 and 8, and bits 5 and 6 not used. If the user wishes to change the canister motor speed via the decrease or increase switches 50, 52, the handle control 26 will send the appropriate data to the canister 34 in discrete steps or a slew type signal.

Pile height data is continuously transmitted to the handle 26 for either an instantaneous or time averaged display at the handle control 26, if requested by the user.

Filter bag and hose pressure sensor data are transmitted to the handle control 26 continuously. If the data indicates a fault, the handle control 26 must see the same fault indication for several seconds before the specific fault is displayed to the user (hose plugged or bag full).

If the power nozzle control circuitry 12 detects a broken belt 20 or obstructed beater bar, it will turn off the power nozzle motor 18 and send the appropriate motion sensor flag bit to the handle circuit over line 74. This causes the handle circuitry 26 to display the trip-out via "check Powermate" LED 62 and sends an appropriate code to the canister control via line 76 to turn the canister motor 40 off. If the power nozzle 12 has been electrically disconnected before turning on the system or during system operation, the handle circuitry 26 detects this situation since only "ones" will be read from the power nozzle circuit 12 to the handle control 26. Under this condition, the handle circuit 26 locks out the motion sensor trip and pile height display.

An important feature of this circuit is the voltage used to transmit data between control boards. The voltage is sufficiently high, in the range of 15 to 25 volts, to ensure electrical continuity, or breakover potential, across the connectors used to tie sub-system controls together, thus allowing the use of low cost connectors while maintaining communication reliability. In one embodiment, a 19 volt data transmission level is used.

Figure 5:
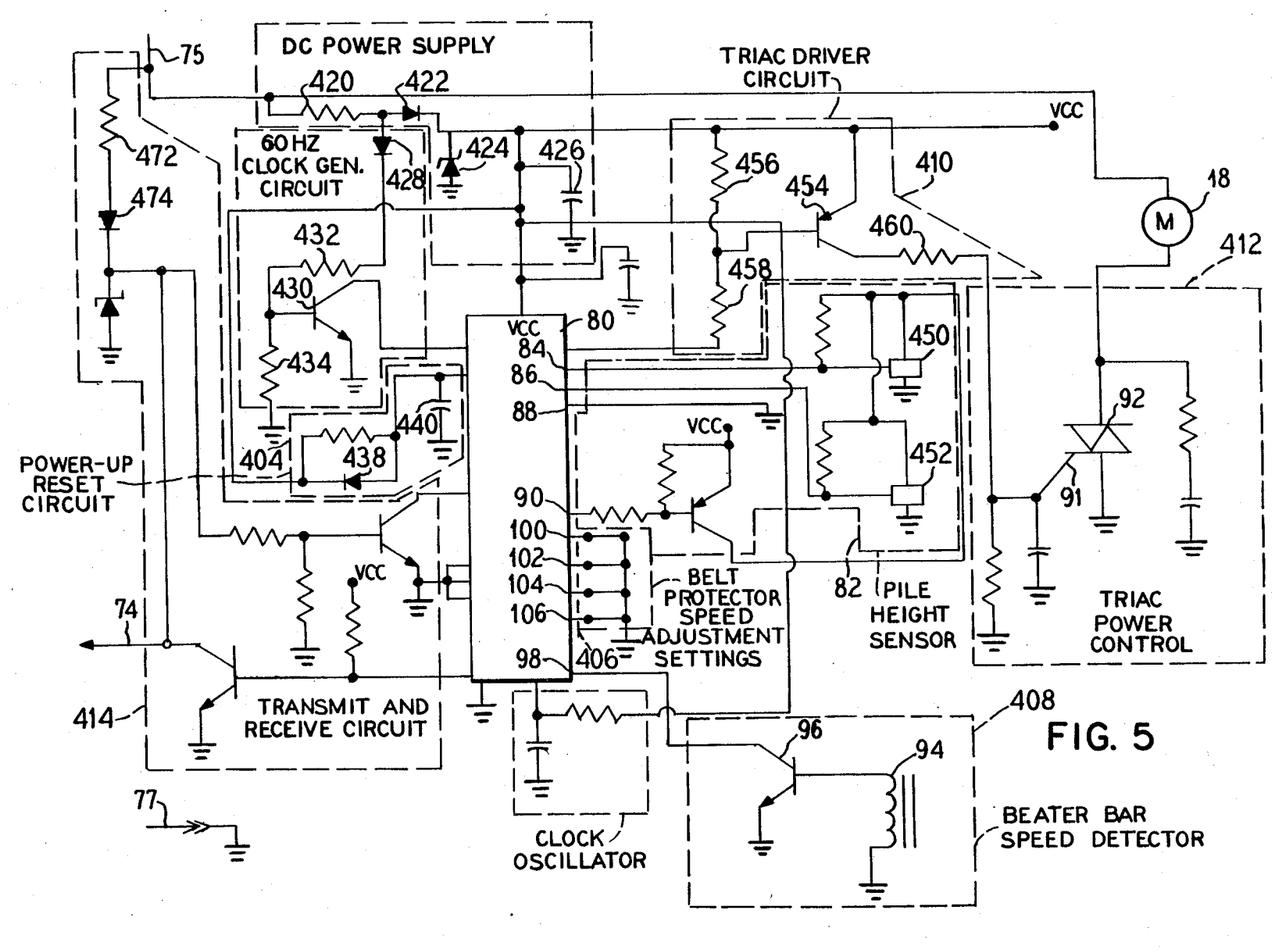
FIG. 5 is an electrical schematic for the control in the power nozzle floor cleaner.

The circuit diagram for the power nozzle 12, known as the "Powermate", is shown in FIG. 5. This portion of the control contains a four-bit microcomputer 80 such as a COPS 411L and associated electronics to control the Powermate motor 18 and to communicate to the handle 26 the pile height and motion sensor data. This communication is done in packet form over the line 74, as described above.

The power nozzle control circuitry of FIG. 5 includes a D.C. power supply 400, a 60 hz. clock generator 402, a power-up reset 404, a belt protector adjustment 406, a beater bar speed detector 408, a pile height sensor 82, a triac driver circuit 410, a triac power control circuit 412, and a transmit and receive portion 414. The D.C. power supply 400 includes a resistor 420, a diode 422, a zener diode 424 and a capacitor 426. The line voltage at the lead 75 is thereby reduced, rectified and filter to approximately 5.6 volts D.C. for supply to the microcomputer 80.

The 60 Hz. clock generator 402, as above, generates a square wave clock signal in synchronization with the A.C. power signal. The power nozzle control 12 utilizes the clock signal not only for communication synchronization but also for zero crossing detection for phase control of the motor 18 speed. A diode 428 halfwave rectifies the line voltage and a transistor 430 and biasing resistors 432 and 434 convert the rectified signal into a square wave clock signal for transmission to the microcomputer 80. The power-up reset 404, that includes a resistor 436, a diode 438, and a capacitor 440, maintains a reset signal at the microcomputer 80 during power-up, just as described in conjunction with FIG. 4.

Pile height data of a carpet is sensed by the pile height sensing device 82 and is input to the microcomputer 80 at input ports 84 and 86 when strobed by the microcomputer via port 90. When a user requests a pile height information, the pile height sensor 82 is activated by a logic zero signal at the port 90 being transmitted to a switch 442. The switch 442 includes a transistor 444 and resistors 446 and 448 which operate to supply power to the sensor 82 long enough to obtain a pile height reading. Supplying power to the sensor 82 only when needed reduces D.C. power supply requirements and heat build up in the power nozzle 12.

Although many different types of sensors may be used, the sensor 82 includes a spring loaded probe (not shown) to penetrate into the carpet pile. Penetration depth is determined by probe diameter, spring force and carpet pile. For a known probe diameter and spring tension, the carpet pile can be determined. In one embodiment, the probe depth sensor is a pair of Hall effect sensors 450 and 452 which sense the displacement of two magnets (not shown) mounted on the probe for a one of four possible range resolution. In range one, neither Hall effect sensor is on, while in range two the sensor 450 is on. In range three both sensors 450 and 452 are on, while in range four only sensor 452 is on. Increasing the number of sensors and magnets can increase the resolution of the sensor 82. Once sensed, the microcomputer 80 converts the pile height data input on pins 84 and 86 to a form for transmittal to the handle control 26 for display to the user.

The triac driver circuit 410 is controlled by the microcomputer 80 to turn on the Powermate motor 18 by pulsing a gate 91 of a triac 92 in the triac power control 412 such that full power is applied to the Powermate motor 18, thus reducing the DC power supply requirements of the control. The triac driver circuit 410 includes a transistor 454 and resistors 456, 458 and 460. The microcomputer 80 monitors the output of the 60 Hz. clock generator 402 for positive-going and negative-going transitions, and, when such transition occurs, applies a logic zero to pin 462 to turn on the transistor 454. When the transistor 454 is turned on, it supplies power through the current limiting resistor 460 to the gate 91 of the triac 92. After a time interval, a logic one is applied at the pin 462 to turn off the transistor 454 and remove power from the triac gate 91. The microprocessor 82 is also programmed to phase fire the triac 92 for diagnostic testing of belt protector cutout RPM during the manufacturing process.

The triac power control 412 includes a resistor 464 and a capacitor 466 to protect the triac 92 from voltage change turn on, a resistor 468 to load the gate 91, and a capacitor 470 to filter out noise.

The beater bar 16 speed is monitored by the speed detector 408 which has a reluctance pickup coil 94 and a magnet (not shown) in the beater bar 16. As the Powermate beater bar 16 spins, the magnet rotates past the coil 94, generating an AC pulse across the coil windings. The AC voltage generated is placed across the base-emitter junction of a transistor 96 to turn it on for a short period of time. As a result, a signal pulse is sent to pin 98 on the microcomputer 80 for counting. The microcomputer 80 then counts the number of pulses generated within a specific time period. The count is then compared to a trip-out, or cut-out, value stored in memory (ROM). If the count is less than the stored value indicating a jammed beater bar 16, the microcomputer 80 turns the triac 92 off, thus, turning off the Powermate motor and transmitting a fault condition to the handle control.

An important feature of this control is the ability to modify the trip-out values stored in memory to accommodate for different motor performance characteristics without the need to remask the microcomputer 80. This is accomplished using four input lines to the microcomputer 100, 102, 104 and 106. By grounding them in the proper order, one of sixteen possible combinations can be obtained. If the expected mean value of cut-out RPM is stored in ROM, it can be modified according to the bit pattern input on pins 100, 102, 104 and 106. Assigning small RPM modification to each bit change, the base value can be modified in plus seven or minus eight increments. We have found a satisfactory base value of 2340 RPM with 60 RPM increments, which results in a cut-out RPM range of 1920 to 2880 RPM. Another embodiment utilizes 20 RPM increments. This feature allows maximum flexibility to the manufacturer to quickly compensate the cut-out RPM, if required, for such as changes in horsepower rating of motors used.

The transmit and receive portion 414 communicates data to and from the handle control portion 26. A resistor 472 and a diode 474 reduce the voltage level from the power line 75 and half-wave rectify the 60 Hz. signal for the data transmission line 74. A zener diode 476 clamps the maximum voltage on the lead 74 at approximately 19 volts. Data is transmitted by a transistor 478, the collector of which is tied to line 74, and a resistor 480 connected between the base of the transistor 478 and the output of the D.C. power supply 400. The microcomputer 80 causes the transistor 478 to transmit data at the negative-going transistions of the 60 Hz. clock signal.

Data is received from the master control of the handle 12 by the microcomputer 80 through resistors 482 and 484, as well as a transistor 486, by monitoring the collector of the transistor 486 at negative going transitions of the clock signals. The collector will be at a logic one for the transmission of a logic zero, and at a logic zero for the transmission of a logic one.

Figure 3:
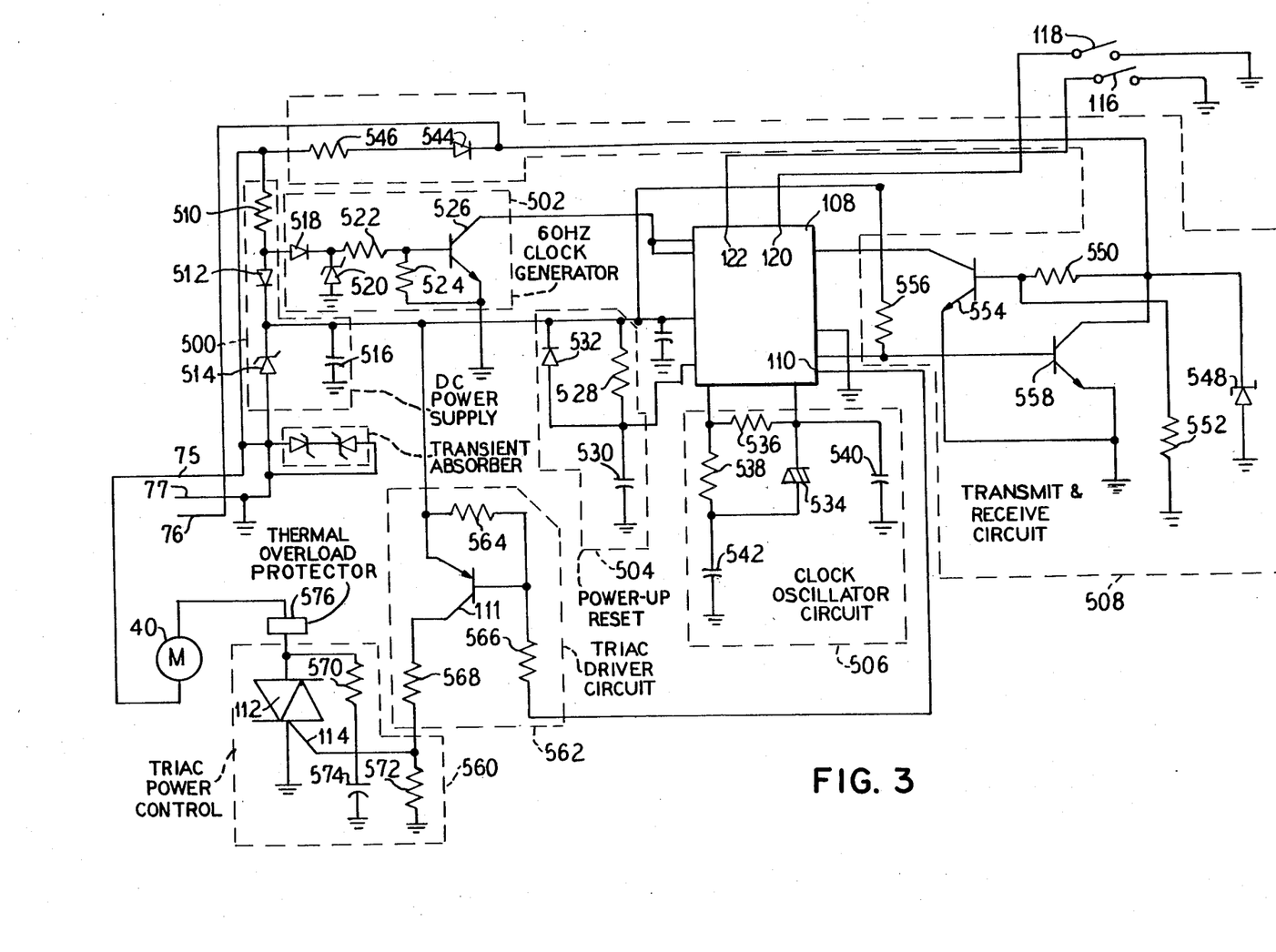
FIG. 3 is an electrical schematic for the control circuit in the canister.

The circuitry for the canister control is shown in FIG. 3 a contains a four-bit microcomputer 108 such as a COPS 410L and associated electronics to control the canister motor 40 and to communicate to the handle control circuitry filter bag pressure and hose pressure sensor data, as described above. As with the handle control circuit and the power nozzle circuit, the canister control circuit includes a D.C. power supply 500, a 60 Hz. clock generator 502, a power-up reset 504, a clock oscillator circuit 506, and a transmit and receive circuit 508. More specifically, the D.C. power supply 500 includes a resistor 510, a diode 512, a zener diode 514, and a capacitor 516 for providing an approximately 5.6 volt D.C. supply to the microcomputer 108. The 60 Hz. clock generator 502 includes a diode 518, a zener diode 520, resistors 522 and 524, and a transistor 526 for generating a square wave in synchronization with the A.C. power signal. The power-up reset 504 includes an RC circuit having a resistor 528, a capacitor 530 and a diode 532 drain for holding the microcomputer 108 at reset during power-up. The clock oscillator 506 generates a signal for microcomputer 108 timing control and includes a ceramic resonator 534, in one embodiment having a resonator frequency of 455 KHz., a pair of resistors 536 and 538 and a pair of capacitors 540 and 542.

The transmit and receive circuit 508 is substantially similar to that of the power nozzle control of FIG. 5 and includes a diode 544 and resistor 546 for line power rectification and reduction, a zener diode 548 for peak voltage clamping, biasing resistors 550 and 552 and a transistor 554 for amplifying received data, and a a resistor 556 and a transistor 558 for transmitting data. The control continuously receives and transmits data packets from and to the handle control in the format previously described.

The canister control shown in FIG. 3 has a triac power control 560 for controlling the canister motor 40 and a triac driver circuit 562 for operating the triac control 560. The triac driver 562 has a transistor 111 and three resistors 564, 566 and 568 while the triac control circuit 560 has a triac 112, resistors 570 and 572, and a capacitor 574. Upon initial power up, that is, inserting the plug 44 into a wall outlet, the control sets the output at pin 110 to the off level, keeping transistor 111 and the triac 112 off, thus also keeping the canister motor 40 off. Upon receipt of a data packet requiring the canister motor 40 to be turned on, the system applies full power to the canister motor 40. Full power is applied until the master handle control 26 sends a data packet requiring a lower speed setting. Speed changes are programmed to occur in steps at a change rate that is slow enough for the user to easily discern and use audible feedback to terminate the speed changing process at the desired level. The canister microcomputer 108 stores the selected motor speed in RAM. If the user turns the vacuum system off and then turns the system on sometime later, the canister microcomputer 108 will use the speed last selected by the user. Full power is applied, however, for a few line cycles to ensure that the motor 40 starts under low line voltage conditions. This aspect of the control is especially important if the canister motor 40 must start at one of the lower speeds under low line conditions. The control ensures that the canister motor 40 will always start quickly and not stall out.

As with the power nozzle control, the canister microcomputer 108 turns on controls the speed of the motor 40 by phase firing of the triac 112 by pulsing a gate 114, thus reducing the DC power supply requirements and heat build up of the control. The microcomputer 108 monitors the 60 Hz. clock input for positive-going or negative-going transitions. When a transition occurs, the microcomputer 108 delays for a predetermined time interval, the duration of which depends upon the motor speed selected, and then applies a logic zero at the pin 110. The application of the logic zero causes current flow through the resistors 564 and 566 which turns on the transistor 111 to supply power to the triac gate 114. Power is supplied to the gate 114 just long enough to turn on the triac 112 before the pin 110 is switched to a logic one and the triac 112 is turned off. A thermal overload protector 576 is connected between the motor 40 and the triac 112.

Motor speeds are derived by phased firing of the triac 112 at the phase angles listed below with the resulting voltages being delivered to the motor (assuming a line voltage is 117 V RMS).

TABLE 1

| Speed | Angle | Motor Voltage (RMS) |
| --- | --- | --- |
| 5 | 7° | 115 |
| 4 | 62° | 104 |
| 3 | 80° | 93 |
| 2 | 92° | 84 |
| 1 | 104° | 73 |

A plugged hose 24 or a full filter bag 46 is sensed by the canister microcomputer 108 via hose and bag pressure sensors. A hose sensor 116 is a digital switch that switches on when the pressure differential from atmosphere to the inlet of the canister reaches some predetermined value. A bag sensor 118 is a digital switch that switches on when the pressure differential from atmosphere to the filter bag compartment reaches some predetermined value. Under a plugged hose condition, only the bag sensor 118 will actuate. This information is input to the microcomputer via pins 120, 122 and converted to a format to be transmitted to the handle control. Because the values of pressure differential are preselected, pressure sensor data is not monitored by the handle control unless the canister motor 40 is running at full speed. As mentioned above, the handle control microcomputer 72 must be advised of the same fault for several seconds before displaying the fault to the user, thus, eliminating false indications occuring due to normal variations in pressure levels when moving the power nozzle 12 over work surfaces.

A transient absorber circuit 578 is connected across the A.C. power lines 75 and 77 to prevent line transients from destroying the control circuitry. The transient absorber 578 includes a pair of zener diodes 580 and 582 mounted back-to-back.

Functionality testing of the control circuitry is also provided. In a first test mode, three switches labeled "increase speed" 52, "Powermate on/off" 58 and "display pile height" 56 are pushed at the same time. When this is done, the canister motor 40 phase fires at the highest speed. The Powermate motor 18 phase fires at a phase angle which gives approximately 90 VAC RMS. A normal thirty second delay due to the activation of the pressure transducers 116, 118 in the canister 34 is eliminated. The full-bag sensor flashes the "full-bag" indicator LED 64 on the handle 26. The hose sensor flashes the "check hose" LED 66 on the handle. If both sensors are activated, then both the "check hose" and "check bag" LEDs on the handle flash. The lock out function for the pile-height is eliminated. The pile height probe may be moved and read at the same time on the handle. To return the unit to the initial off state, the on/off canister switch 48 must be pushed.

A second test involves pushing the three switches marked "Powermate on/off" 58, "increase speed" 52, and "decrease speed" 50 at the same time. The "check bag" 64, "check hose" 66 and "check Powermate" 62 LEDs all flash. This is to verify that the handle control can control the LEDs and that all LEDs are working. To return the unit to the initial off state, the "on/off canister" switch 48 must be pushed. Activation of the second test cancels the first test and activation of the first test cancels the second test.

With the provisions of these diagnostic functions, the assembly and testing personnel can more quickly test the operationality of the control without waiting for the various built in time delays to pass. This provides a high reliability in testing which can be performed in a short time period.

Figures 15, 16:
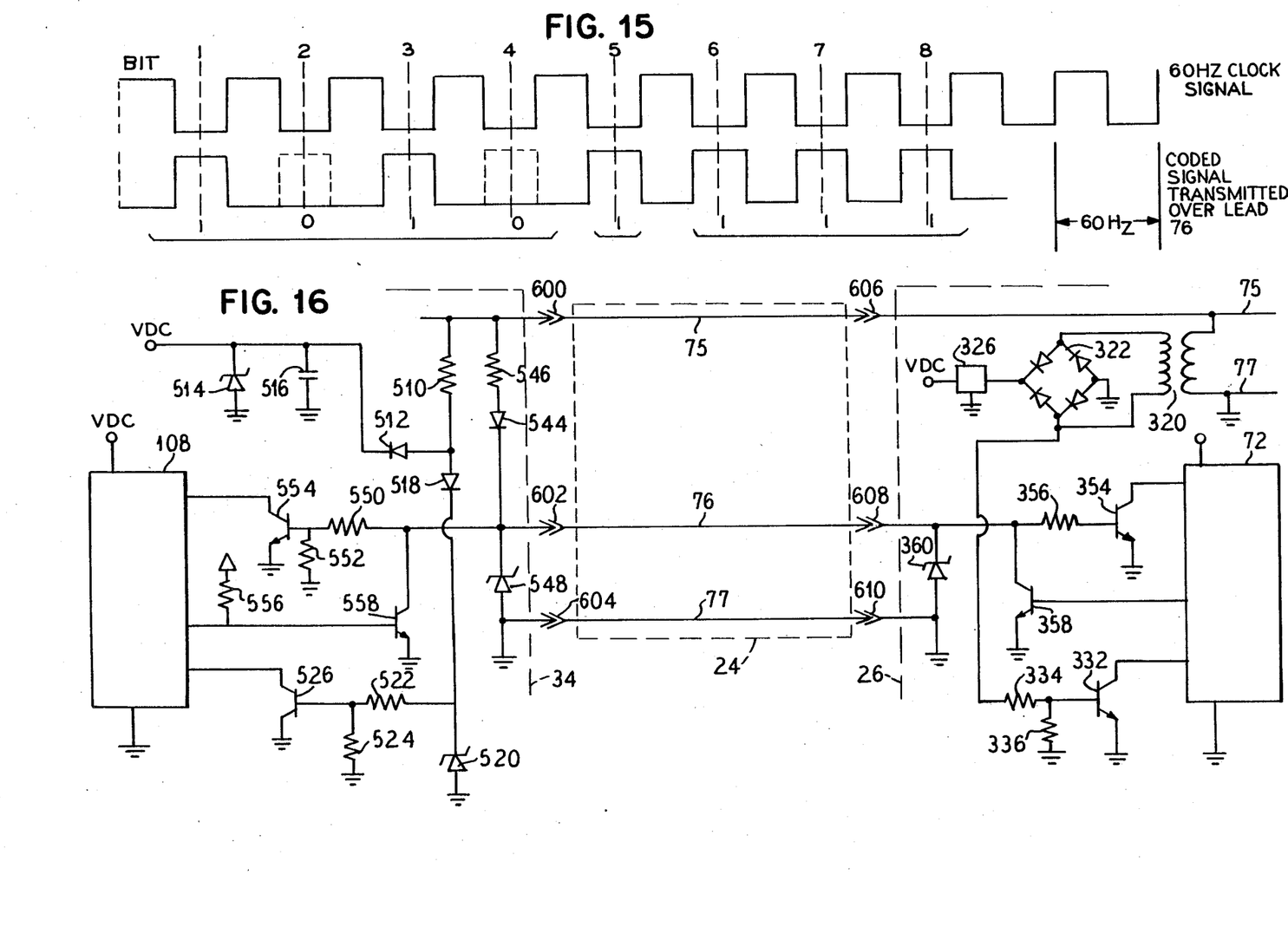
FIG. 15 is a voltage-time diagram of one serially transmitted code packet for transmission from the handle to the canister.
FIG. 16 is an electrical circuit diagram of information transmitting and receiving circuitry in the canister and the handle.

An example of a data packet for transmission from the handle control to the canister control is shown in FIG. 15. Data bits are transmitted at each negative-going transition of the clock signal such that the data transmission is in synchronization with the clock. For a logic zero to be transmitted, the lead 76 is held to "zero" at a negative-going transition of the clock signal, and, for a logic one, the lead 76 is raised to a logic one level at a negative-going clock transition. Referring to FIG. 12 in conjunction with FIG. 15, the first four bits transmitted, comprising the preamble which is "1010"; while the on/off bit is high indicating that the canister motor 40 is to be on. The last three "motor speed" bits are each logic one, thereby controlling the motor 40 to its highest speed.

In FIG. 16 is shown the signal transmitting and receiving circuitry connected between the handle control and the canister control over which the serial bit pattern of FIG. 15 is transmitted. For the sake of clarity, only the microcomputers 72 and 108, the D.C. power supplies, the 60 Hz. clock generators and the pertinent transmit and receive circuits are shown. A.C. power is connected at leads 75 and 77 and is half-wave rectified so that the clock generator transistors 332 and 526 generate a synchronized square wave signal, as can be seen in the upper diagram of FIG. 15. The rectified signals are further regulated and filtered to supply power to the respective microcomputers 72 and 108. The microcomputer 72 transmits an eight bit data packet over lead 76 to the microcomputer 108 by transmitting an inverted form of the data to the base of the transistor 358 in synchronization with the clock signal. The transistor 358 either holds the line 76 to a logic zero or raises it to a logic one, depending on the bit transmitted. The lead 76 is controlled at a relatively high date voltage level, preferably about 19 volts, by the resistor 546 in conjunction with the diode 544 and zener diode 548 for breakover at the connectors 600, 602, 604, 606, 608 and 610. The signals on the third lead 76 are received at the base of the transistor 554 through the resistor 550, where they are amplified. The microcomputer 108 monitors the amplified data signals in synchronization with the clock signals. In this way data is serially transmitted between the control circuits in data packets of eight bits. Synchronization is derived from the A.C. power signal and the voltage level for the data transmission is sufficiently high to overcome inhibiting factors present at the connectors.

Flow charts showing the operation of the controls are presented in FIGS. 6, 7, 8A and 8B.

Figure 6:
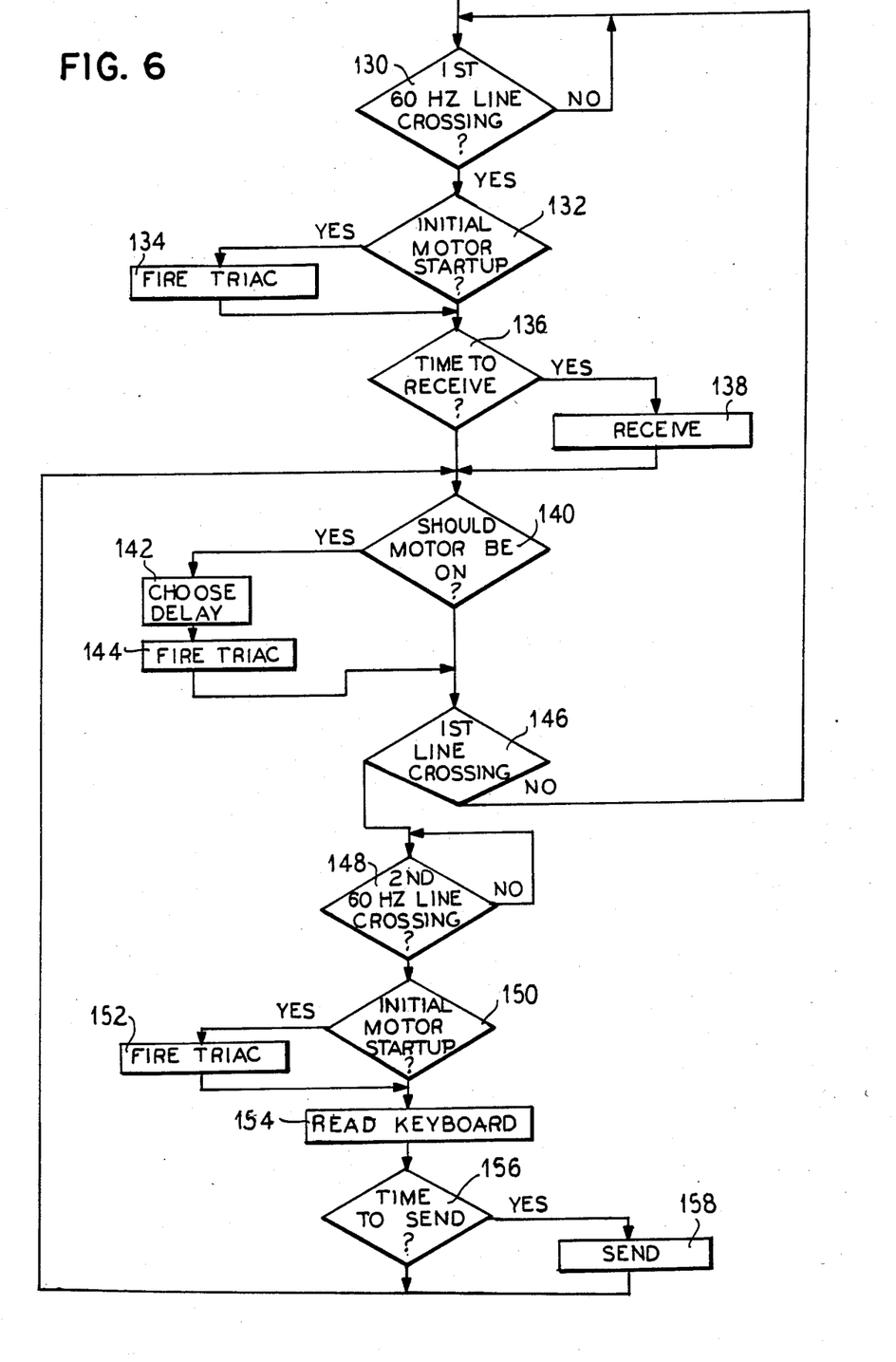
FIG. 6 is a flow chart for the control circuit of the canister.

FIG. 6 shows a general flow chart for the canister control. Control begins in control unit 130 in which a inquiry is continuously made as to whether there is a first 60 Hz line crossing. When such a crossing has occurred, control is passed to control unit 132 which inquires whether there should be an initial motor start up. If the answer is affirmative, control passes to control unit 134 which causes the triac 112 to be fired. If the answer is negative, or after the triac has been fired, control is passed to control unit 136 which inquires if it is time to receive data.

If the answer to the inquiry in control unit 136 is yes, control is passed to control unit 138 in which data is received. If the answer to the inquiry is no or after the data has been received, control is passed to control unit 140 which inquires whether the motor 40 should be on. If the answer to the inquiry is yes, control is passed to control unit 142 where the appropriate delay is chosen and then control passes to control unit 144 to fire the triac 112. If the answer in control unit 140 is negative or after the triac 112 has been fired, control is passed to control unit 146 to inquire if there has been a first line crossing. If the answer is no, control is passed back to control unit 130 to repeat the procedure described above.

If the answer to the inquiry in control unit 146 is affirmative, control is passed to control unit 148 where a continuous inquiry is made as to whether a second 60 Hz. line crossing has occurred. Once the answer to this inquiry is affirmative, control is passed to control unit 150 which inquires whether there should be an initial motor start up. If the answer to this inquiry is affirmative, control is passed to control unit 152 to fire the triac 112. If the answer to inquiry in control unit 150 is negative or after the triac 112 is fired, control is passed to control unit 154 in which the keyboard is read. Control is then passed to control unit 156 which inquires whether it is time to send data. If the answer to this inquiry is yes, control is passed to control unit 158 to send the data. If the answer to inquiry in control unit 156 is negative or after the data is sent by control unit 158, control is passed back to control unit 140 to repeat the procedure described above.

Figure 7:
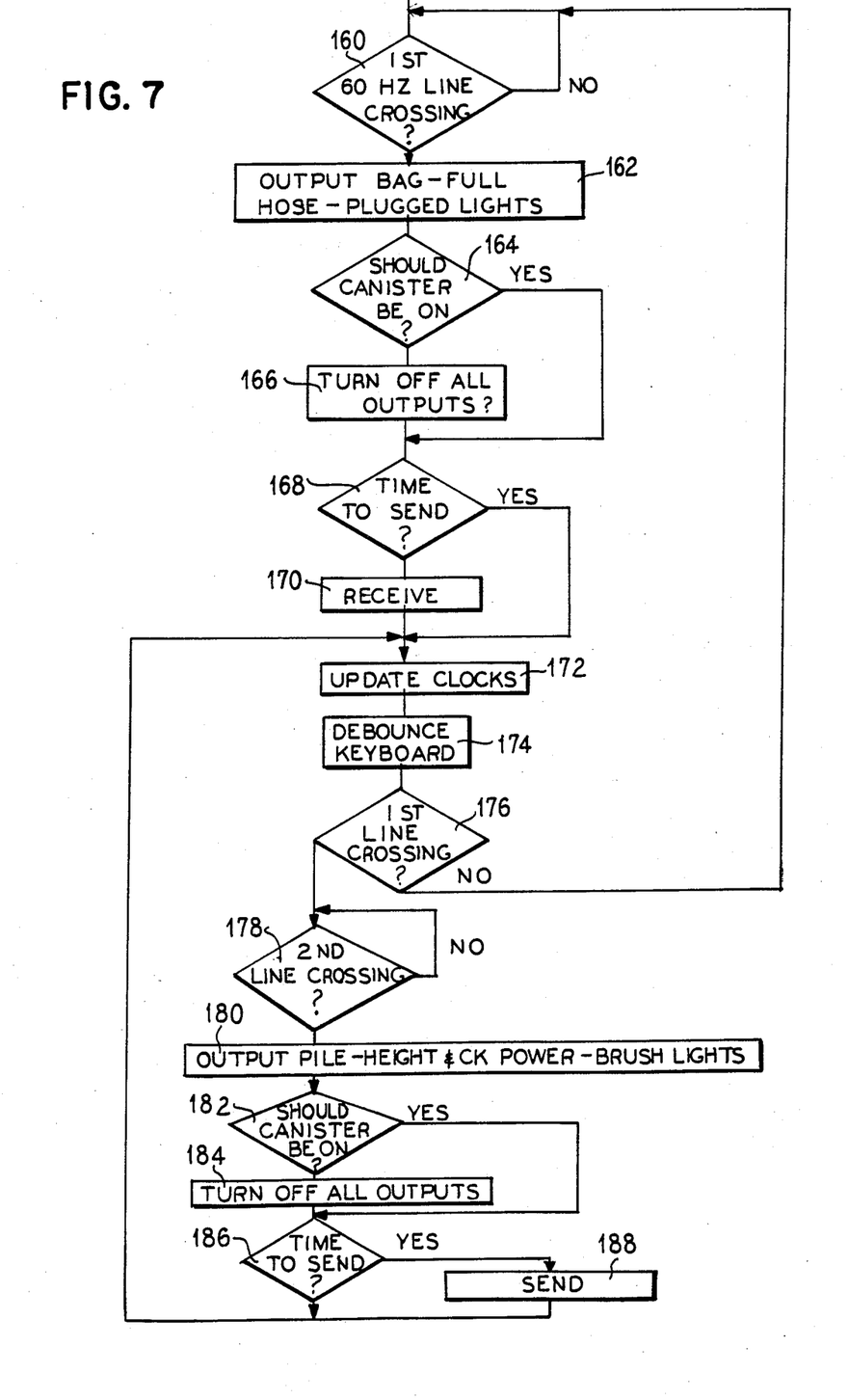
FIG. 7 is a flow chart for the control circuit of the handle.

FIG. 7 shows a general flow chart for the handle circuit. Control begins in control unit 160 where a continuous inquiry is made as to whether a first 60 Hz. line crossing has occurred. Once the answer to that inquiry is affirmative, control passes to control unit 162 which sends an output to the bag full and hose plugged LEDs 64, 66. Control is then passed to control unit 164 where an inquiry is made as to whether the canister motor 40 should be on. If the answer to this inquiry is negative, control passes to control unit 166 which turns off all outputs. If the answer to the inquiry in control unit 164 is affirmative or after the outputs have been turned off, control is passed to control unit 168 which inquires whether it is time to send data.

If the answer to the inquiry in control unit 168 is negative, control is passed to control unit 170 causing data to be received. If the answer to inquiry in control unit 168 is affirmative or after data has been received by control unit 170, control is passed to control unit 172 in which the clocks are updated and then control is passed to control unit 174 in which the keyboard is debounced.

Control then passes to control unit 176 which inquires whether there is a first line crossing. If the answer to this inquiry is negative, control is passed back to control unit 160 to repeat the procedure described above. If the answer to the inquiry in control unit 176 is affirmative, control is passed to control unit 178 which continuously inquires whether there has been a second line crossing. Once an affirmative answer is received to this inquiry, control is passed to control unit 180 in which output for the pile height and check power brush lights is sent.

Control then passes to control unit 182 which inquires whether the canister should be on. If the answer to this inquiry is negative, control passes to control unit 184 to turn off all outputs. If the answer to the inquiry in control unit 182 is affirmative or after all outputs have been turned off, control is passed to control unit 186 where inquiry is made as to whether it is time to send data. If the answer to this inquiry is affirmative, control is passed to control unit 188 to send the data. If the answer to the inquiry in control unit 186 is negative or after the data has been sent by control unit 188, control is passed back to control unit 172 to repeat the above procedure.

Figure 8A:
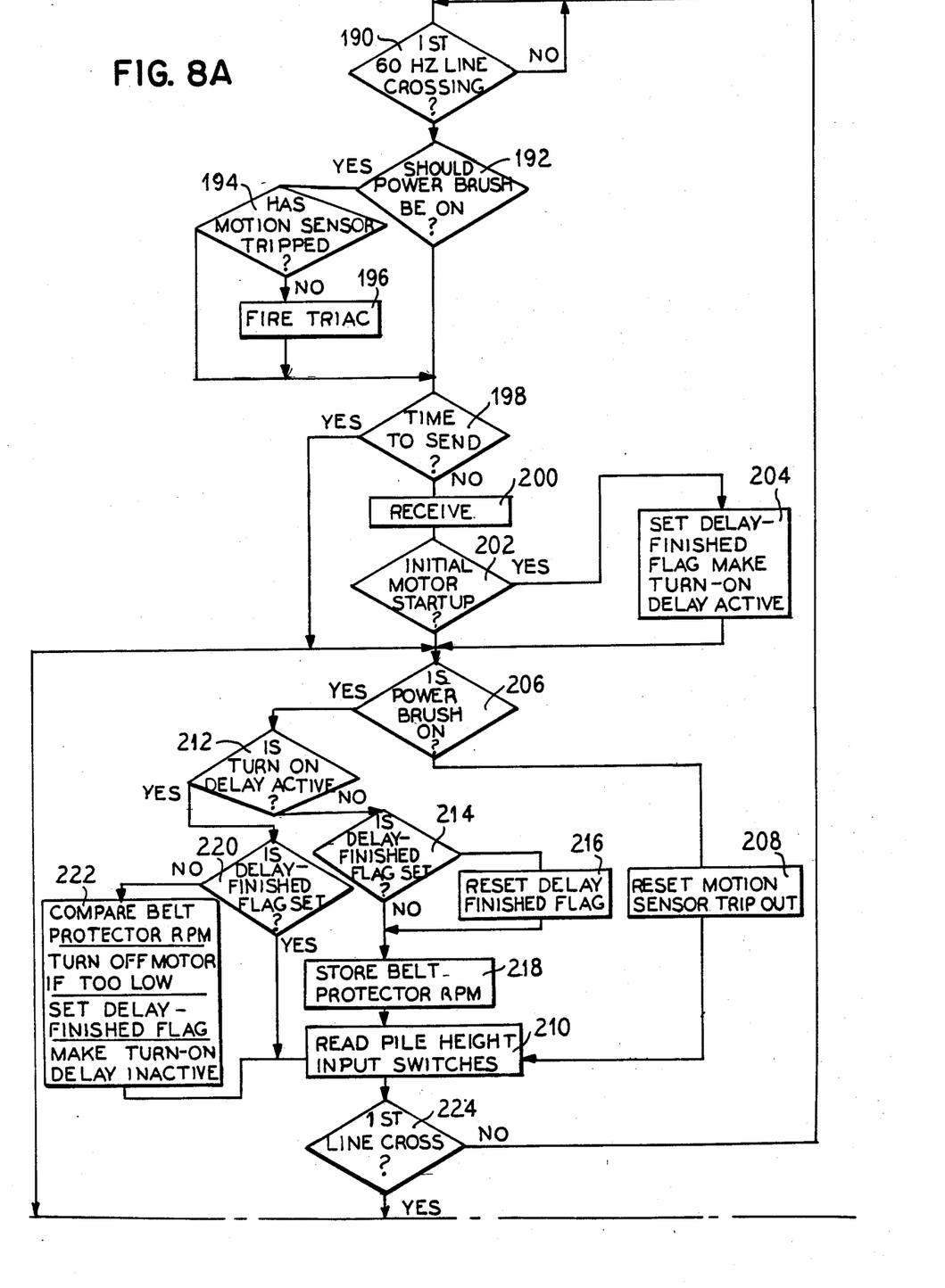
FIG. 8 is a flow chart for the control circuit of the power floor cleaner.
Figure 8B:
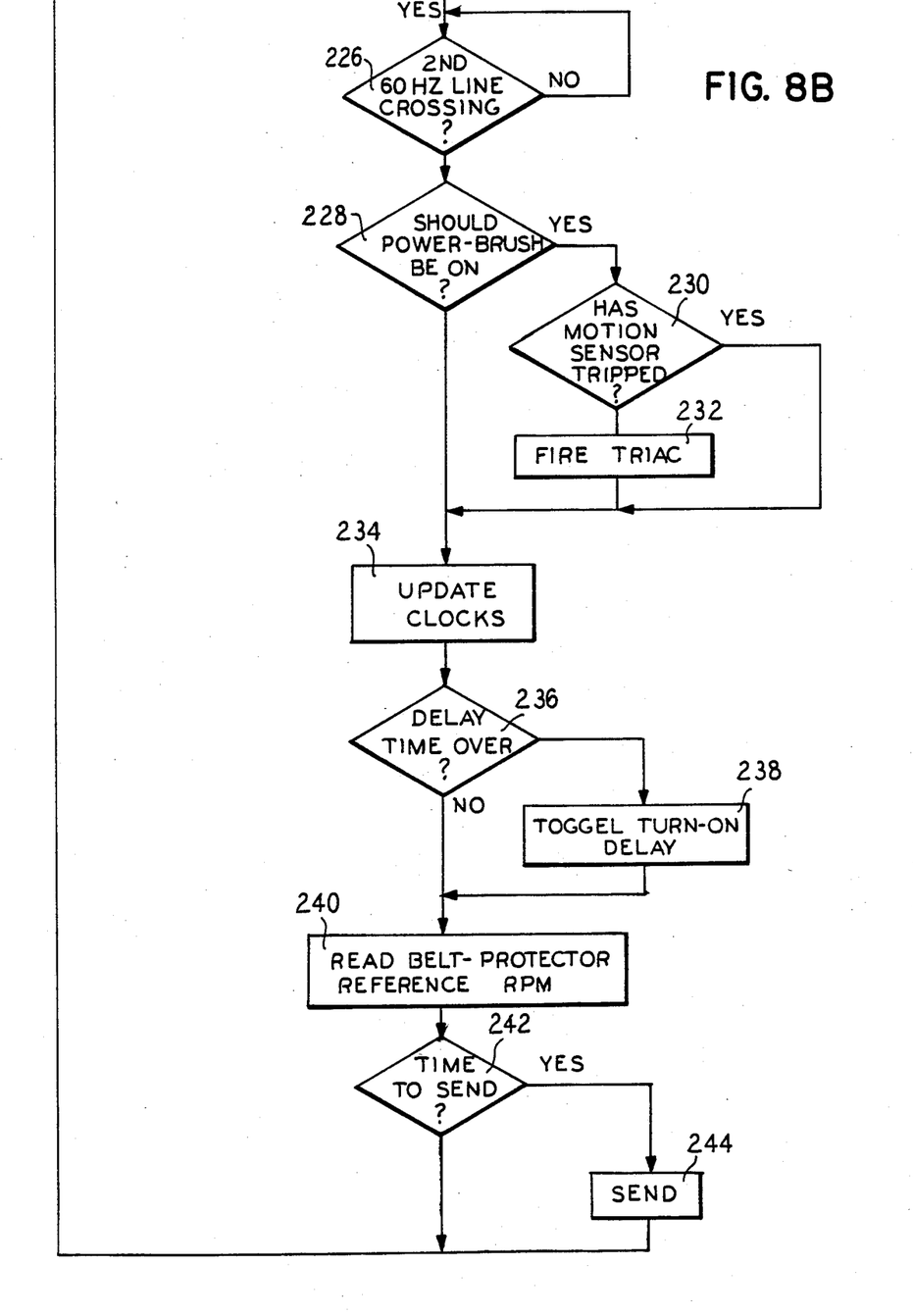

FIGS. 8A and 8B show a general flow chart for the power nozzle control circuitry. Control first passes to control unit 190 which continuously inquires whether there is a first 60 Hz. line crossing. Once the answer to this inquiry is affirmative, control passes to control unit 192 which inquires whether the power brush motor 18 should be on. If the answer to this inquiry is affirmative, control passes to control unit 194 which inquires whether the motion sensor has tripped. If the answer to this inquiry is negative, control is passed to control unit 196 which causes the triac 92 to be fired.

If the answer to the inquiry in control unit 192 is negative, or the answer to the inquiry in control unit 194 is affirmative, or after the triac has been fired by control unit 196, control is passed to control unit 198 which inquires whether it is time to send data. If the answer to this inquiry is negative control passes to control unit 200 in which data is received. Control then passes to control unit 202 which inquires whether there should be an initial start up. If the answer to this inquiry is affirmative, control passes to control unit 204 which sets a delay-finished flag and makes a turn-on delay active.

If the answer to inquiry in control unit 198 is affirmative, or the answer to inquiry in control unit 202 is negative or after the delays are set and made active by control unit 204, control is passed to control unit 206 which inquires whether the power brush motor 18 is on. If the answer to this inquiry is negative, control is passed to control unit 208 which resets the motion sensor trip-out and then control is passed to control unit 210 in which the pile height input switches are read.

If the answer to the inquiry in control unit 206 is affirmative, control passes to control unit 212 which inquires whether the turn-on delay is active. If the answer to this inquiry is negative, control is passed to control unit 214 which inquires whether the delay-finished flag is set. If the answer to this inquiry is affirmative, control is passed to control unit 216 to reset the delay-finished flag. If the answer to inquiry in control unit 214 is negative or after the delay-finished flag is reset by control unit 216, control is passed to control unit 218 which stores the belt protector RPM. Control is then passed to control unit 210 to read the pile-height input switches.

If the inquiry in control unit 212 is affirmative, control is passed to control unit 220 to inquire whether the delay-finished flag is set. If the answer to this inquiry is negative, control is passed to control unit 222 to compare the belt protector RPM, to turn off the motor 18 if the RPM is too low, to set the delay-finished flag and to make the turn-on delay inactive. If the answer to the inquiry in control unit 220 is affirmative or after all of the steps of control unit 222 have been performed, control passes to control unit 210 to read the pile-height input switches.

Control then passes to control unit 224 which inquires whether there is first line crossing. If the answer to this inquiry is negative, control passes back to control unit 190 to repeat the procedure described above. If the answer to this inquiry is affirmative, control passes to control unit 226 which continuously inquires whether there has been a second 60 Hz line crossing. When the answer to this inquiry is affirmative, control passes to control unit 228 which inquires whether the power-brush motor 18 should be on. If the answer to this inquiry is yes, control passes to control unit 230 which inquires whether the motion sensor has tripped. If the answer to this inquiry is negative, control passes to control unit 232 which causes the triac 92 to be fired.

If the answer to inquiry in control unit 228 is negative, or the answer to inquiry in control unit 230 is affirmative, or after the triac has been fired by control unit 232, control passes to control unit 234 which updates the clocks. Control then passes to control unit 236 which inquires whether the time delay has expired. If the answer to this inquiry is affirmative, control passes to control unit 238 which toggles the turn-on delay. If the answer to inquiry in control unit 236 is negative or after the turn-on delay has been toggled by control unit 238, control passes to control unit 240 in which the belt protector reference RPM is read. Control then passes to control unit 242 which inquires whether it is time to send data. If the answer to this inquiry is affirmative, control passes to control unit 244 to send the data. If the answer to the inquiry in control unit 242 is negative or after the data has been sent by a control unit 244, control passes back to control unit 206 to repeat the procedure described above.

From the foregoing description of a preferred embodiment of the invention it is seen that the present invention provides a control for vacuum cleaner having three separate circuits to control various functions in the canister and power floor cleaner and to permit the user to control these functions through the handle on the suction hose. Also, indicator lights are provided on the control to alert the user and to apprise the user of various sensed and selected parameters. Further, diagnostics testing is built into the circuits to assist in the manufacturing and testing processes.

As is apparent from the foregoing specification, the invention is susceptible of being embodied with various alterations and modifications which may differ particularly from those that have been described in the preceeding specification and description. It should be understood that we wish to embody within the scope of the patent warranted hereon all such modifications as reasonably and properly come within the scope of our contribution to the art.

We claim as our invention:

1. A vacuum cleaner comprising:
   a motor fan suction unit having a first electric motor;
   a floor contacting motor brush unit having a second electric motor driving a rotating brush;
   a suction hose connecting said suction unit and motor brush unit having a hand engaging portion when in use in easy access position for propelling said motor brush unit over a floor;
   means for controlling the energization of said first and second motors simultaneously;
   means for controlling the energization of said second motor independent of said first motor;
   means for controlling the speed of said first motor independent of said second motor;
   circuit means for connecting both said motors to said control means and to a source of alternating current comprising three current carrying conductors embodied in said hose;
   means for detecting pressure levels in said motor fan suction unit and in said suction hose;
   means on said hand engaging portion for indicating to a user that a low suction level is present in said motor fan suction unit and in said suction hose when detected;
   means for measuring the rotational speed of said rotating brush; and
   means on said hand engaging portion for indicating to the user that said brush is rotating below a preselected rotational speed.

2. A device according to claim 1 including:
   means for measuring carpeting pile height; and
   means on said hand engaging portion for indicating to the user the measured pile height.

3. A device according to claim 1 including means on said handle engaging portions for indicating to the user the selected speed of said first motor.

4. In a vacuum cleaner comprising:
   a canister unit having a first electric motor driving a suction fan;
   a floor contacting motor brush unit having a second electric motor driving a rotating brush;
   a suction hose unit connecting said suction unit and motor brush unit having a handle portion when in use in easy access position for propelling said motor brush unit over a floor;
   a control comprising:
   a first microcomputer in said handle portion;
   a second microcomputer in said canister unit;
   a third microcomputer in said floor contacting motor brush unit;
   switch means on said handle providing user selection of energization of said first and second motors simultaneously;
   switch means on said handle providing user selection of speed changes for said first motor;
   switch means on said handle providing user selection of energization of said second motor independent of said first motor;
   means for transmitting from said first microcomputer to said second microcomputer information regarding user selection of energization and speed for said first motor;
   means for detecting pressure levels in said canister and in said suction hose and inputting said detected levels into said second microcomputer;
   means for transmitting from said second microcomputer to said first microcomputer information regarding detected pressure levels in said canister and said suction hose;
   means for transmitting from said first microcomputer to said third microcomputer information regarding said user selection of energization for said second motor;
   means for measuring the rotational speed of said rotating brush and inputting said speed into said third microcomputer; and
   means for transmitting from said third microcomputer to said first microcomputer information regarding measured speed level of said rotating brush.

5. A device according to claim 4 including:
   means on said handle portion for indicating to a user that a low suction level is present in said motor fan suction unit and in said suction hose when detected.

6. A device according to claim 4 including:
   means on said handle portion for indicating to a user that said brush is rotating below a preselected rotational speed.

7. A device according to claim 4 including:
   means in said floor contacting brush unit to measure carpet pile height; and
   means on said handle portion for indicating to the user the measured pile height.

8. A device according to claim 4 including:
   means on said handle portion for indicating to the user the selected speed for said first motor.

9. A device according to claim 4 wherein said transmission means comprises a current carrying wire connecting said first microcomputer with said second microcomputer and a current carrying wire connecting said first microcomputer with said third microcomputer.

10. In a vacuum cleaner comprising:
    a canister having an electrical suction fan motor;
    a floor cleaner having an electrical motor driven beater bar, and
    a suction hose with a handle portion connecting said floor cleaner with said canister;
    a control system comprising:
      a first circuit containing a microcomputer in said handle portion;
      a second circuit containing a microcomputer in said canister;
      a third circuit containing a microcomputer in said floor cleaner;
      said second circuit controlling the energization and speed of said suction fan motor, measuring the pressure levels within said canister and said suction hose and communicating with said first circuit;
      said third circuit controlling the energization of said beater bar motor, measuring the rotational speed of said beater bar and communicating with said first circuit;

said first circuit having a plurality of user accessible switches for selectively energizing said suction fan motor and said beater bar motor and for changing the speed of said suction fan motor, and having a plurality of indicators to advise the user of improper pressure levels in said canister and said hose and improper rotational speed of said beater bar; and said first cicuit controlling and communicating with said second and third circuits;

whereby, the user can activate and deactivate various functions and be apprised of various occurences all through said handle portion of said hose.

11. A device according to claim 10 wherein said communication between circuits comprises transmission of information in packet form by generating a 60 cycle square wave in synchronization with a 60 cycle power line, and sending one bit of information every full line cycle.

12. A device according to claim 11 wherein said 60 cycle power line comprises a two wire current conductor and communication is done via a third current conductor between said first and second, and first and third circuits and one side of said power line.

13. A device according to claim 10 wherein said third circuit includes means for measuring carpeting pile height, and said first circuit includes indicator means to display measured pile height to the user.

14. A device according to claim 10 including indicator means on said handle portion to display selected speed of said suction fan motor to the user.

15. A device according to claim 10 wherein functionality testing means is provided which is initiated upon the simultaneous activation of a plurality of said switches to cause the energization of said suction fan motor and said beater bar motor and to activate said pressure level indicators, termination of said functionality testing is accomplished by activation of a different one of said switches.

16. A device according to claim 15 including a second functionality testing means initiated upon the simultaneous activation of a different plurality of said switches to activate all of said indicators, termination of said second functionality testing is accomplished by activation of a different one of said switches.

17. In a vacuum cleaner structure having a suction head, means for drawing air and entrained material through said head, a beater brush rotatably mounted to said head for loosening material on a surface being cleaned to cause entrainment thereof in the drawn air, and a drive for rotating said brush including an electric motor and power transmission means rotatively coupling said brush to said motor:

means for providing magnetic pulses at a rate directly corresponding to the speed of rotation of the beater brush; and control means for sensing said pulses and discontinuing energization of said motor whenever the rate of said pulses drops below a preselected value, the improvement comprising:

said control means including a microcomputer with a plurality of input ports being selectively groundable to effect a variation of said preselected value to permit compensation for varying motor speeds in different motor models without requiring a remask of said microcomputer.

18. A canister-type vacuum cleaner, comprising:

a canister having a vacuum motor for generating a vacuum air flow and a filter bag through which said air flow is filtered;

a power nozzle having a rotatable beater bar driven by a beater bar motor;

a handle portion having a control and display panel and a hollow wand section connectable to said power nozzle;

a suction hose being connectable between said canister in communication with said filter bag and said handle portion in communication with said hollow wand section;

a canister control circuit mounted in said canister and having a first microcomputer;

a power nozzle control circuit mounted in said power nozzle and having a second microcomputer;

a handle portion control circuit mounted in said handle portion and having a third microcomputer;

first and second A.C. power leads being connectable to an A.C. power source, said first and second A.C. power leads along said suction hose and said wand section between said canister control circuit and said handle portion control circuit and said power nozzle control circuit;

a first data lead being connected between said canister control circuit and said handle portion control circuit along said suction hose;

a second data lead being connected between said handle portion control circuit and said power nozzle control circuit along said hollow wand;

a first means for transmitting and receiving data connected to said first data lead and said first microcomputer to communicate serial data therebetween; and means at each of said canister control circuit and said handle portion control circuit and said power nozzle control circuit for generating a clock signal in synchronization with a signal from said A.C. power source, said first and third microcomputers transmitting serial data packets therebetween in synchronization with said clock signal, said second and third microcomputers transmitting serial data packets therebetween in synchronization with said clock signal.

19. A vacuum cleaner as claimed in claim 18 wherein said third microcomputer controls the operation of said first and second microcomputers.

20. A vacuum cleaner as claimed in claim 18 wherein one bit in said serial data packets is transmitted at each pulse of said clock signal.

21. A vacuum cleaner as claimed in claim 18, further comprising:

means for setting a maximum data level on said first and second data leads in a range of 15 to 25 volts.

22. A vacuum cleaner as claimed in claim 18 wherein each of said first, second, third and fourth transmitting and receiving means includes:

means for switching said respective data leads between logic one and logic zero, said switching means being controlled by said respective microcomputer; and means for amplifying signals on said respective data leads, said amplifying means being connected to communicate said amplified signals to said respective microcomputers.

* * * * *